United States Patent [19]

Jeon et al.

[11] Patent Number: 4,831,881
[45] Date of Patent: May 23, 1989

[54] CONTINUOUS MONITERING SYSTEM FOR COMPACTION BEHAVIOR OF COMPOSITE LAMINATES IN AUTOCLAVE CURING

[75] Inventors: Eijin Jeon; Wooil Lee, both of Seoul; Kwangjun Yoon, Kyonggido; Taewook Kim, Busan, all of Rep. of Korea

[73] Assignee: Korea Institute of Machinery & Metals, Kyongsangnamdo, Rep. of Korea

[21] Appl. No.: 144,135

[22] Filed: Jan. 15, 1988

[51] Int. Cl.$^4$ .............................................. G01B 7/18
[52] U.S. Cl. ..................................... 73/768; 422/242
[58] Field of Search ................. 422/242; 73/763, 768, 73/774, 818

[56] References Cited

U.S. PATENT DOCUMENTS 3,347,723 10/1967 Hill .................................. 422/242 X Primary Examiner—Myracle Jerry W.
Attorney, Agent, or Firm—Armstrong, Nikaido, Marmelstein, Kubovcik & Murray

[57] ABSTRACT

The autoclave cure process is the representative composite fabrication technique for high quality composite materials for the aerospace and defense industry application. After lay up and vacuum-bagging in a complicated sequence, the several composite material needed in autoclave curing are cured under controlled temperature and pressure. The autoclave curing, in which the total cure process requires at least 4-6 hours, is a very expensive process. Therefore, the determination of an optimal cure process for composite prepregs is very important for guaranteed quality as well as being important economically. Theoretical models cannot be proved because of the lack of experimental methods. The experimenter must run many batches of autoclave curing trial and error at the different curing temperatures and pressures to obtain a sufficient amount of data which can experimentally determine the optimal cure process. Because this invention can continuously monitor the change of thickness of the composite laminate during curing, this measuring system, which can determine the condition of an optimal cure process, is an excellent device to obtain the degree of curing and variation of thickness of a prepreg which is optimal in physical and mechanical properties.

4 Claims, 3 Drawing Sheets

CONTINUOUS MONITERING SYSTEM FOR COMPACTION BEHAVIOR OF COMPOSITE LAMINATES IN AUTOCLAVE CURING

FIELD OF THE INVENTION

The purpose of the invention is to develop the measuring system which can continuously monitor the change of thickness of composite laminates during the autoclave curing process.

BACKGROUND OF THE INVENTION

The autoclave cure process is the representative composite fabrication technique for high quality composite materials for the aerospace and defense industry application. After lay up and vacuum-bagging in a complicated sequence, the several composite materials needed in autoclave curing, are cured under controlled temperature and pressure. The autoclave curing, in which the total cure process requires at least 4-6 hours, is a very expensive process. Therefore, the determination of an optimal cure process for composite prepregs is very important for guaranteed quality as well as being important economically.

The cure kinetics of resin and the compaction behavior of a prepreg should be examined in order to optimize the cure cycle of the prepreg. The measurement of resin cure kinetics is so far carried out by DSC (Differential Scanning Calorimeter) and general thermal analyzing systems.

However, there have been no continuous monitoring methods available for the observation of the compaction behavior of a prepreg in an autoclave.

The theoretical model of resin flow and compaction behavior of the prepreg in curing has been proposed by G. S. Springer (J. of Composite Materials, 1983, Vol. 17) and T. G. Gutosky (SAMPE Quarterly, Vol. 16).

However, these theoretical models cannot be proven because of the lack of experimental methods. The experimenter must run many batches of autoclave curing using trial and error at the different curing temperatures and pressures to obtain a sufficient amount of data which can experimentally determine the optimal cure process. If the compaction behavior of a prepreg in autoclave curing can be continuously monitored, it would be contributed to the effective determination for the optimal condition of an autoclave curing process. This measuring system, which can determine the condition of an optimal cure process, is an excellent device to obtain the degree of curing and variation in thickness of a prrpreg which is optimal in physical and mechanical properties.

SUMMARY OF THE INVENTION

The principle of the invention is that the thickness measuring sensor measures the variation of laminate thickness occurring when the resin viscosity of the prepreg decreases as the cure temperature increases and the resin is absorbed in the bleeder through the perforated steel plate. The principle of the thickness measuring sensor is that the sensor plate is a 3 point bending state by the displacement transform block. The strain is measured by the strain gauge attached to the sensor plate. The prerequisite of the sensor is to have a linear displacement-strain relationship and have restoration and thermal stability, etc. For the sensor, the minimum thermalinduced error is required to be minimal in the temperature range of 20° C. to 150° C.

DESCRIPTION OF THE PREFERRED EMBODIMENTS

Figure 1:
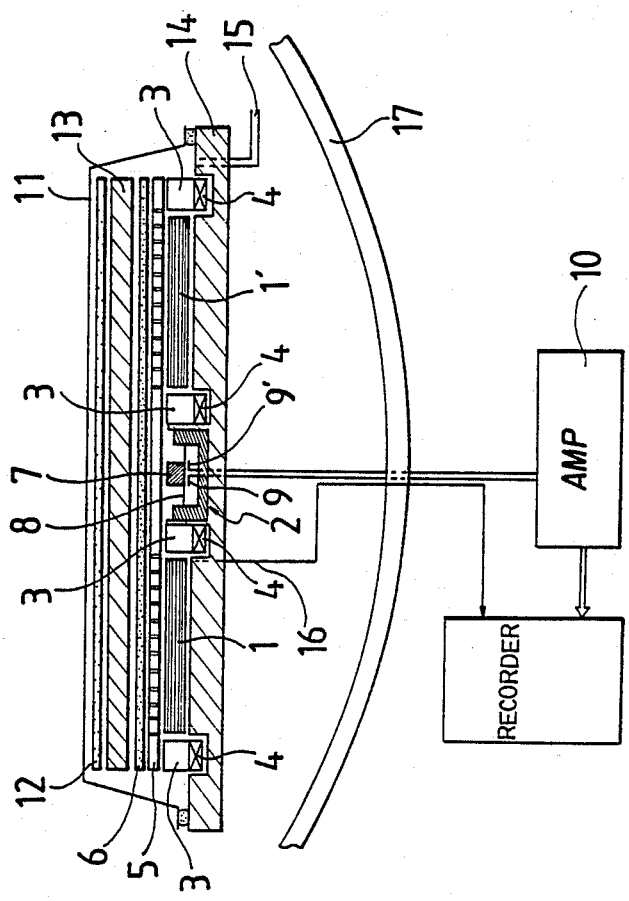
FIG. 1 is a schematic of a measuring system for compaction behavior of a composite laminate.

This invention is described in detail with the figures. A schematic of the measuring system is shown in FIG. 1. The thickness measuring sensor (2) is placed between two composite laminates (1)(1') of the same dimension. Each laminate is surrounded by a steel dam (3) to prevent the side resin flow in the plane of the prepreg ply. The steel dams are supported at the bottom with a very weak spring (4) and are allowed to move up and down in the grooves on the tool plate. A perforated steel plate (5) is placed on top of the two laminates. On the top of the perforated steel plate, bleeders (6) are placed.

As composite plies are compacted by pressing the contact block (7) (displacement transform block), the perforated steel plate moves down causing the three point bending bar (8) to be deflected downward. The amount of the deflection of the bar is detected by strain gauges (9)(9') attached to the bending bar.

The gauge signal is then amplified by a strain amplifier (1). The whole structure as shown in FIG. 1 is put in an autoclave and the signal is recorded on a strip chart recorder.

Figure 2A:
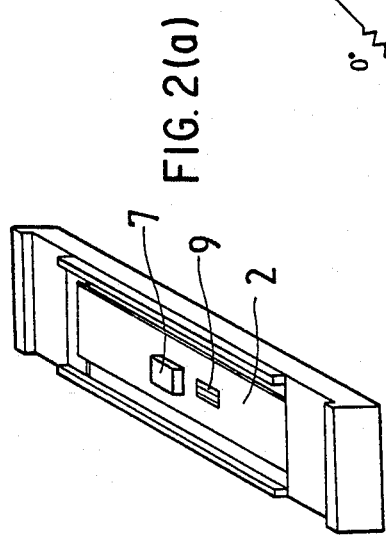
FIGS. 2a-2c shows a thickness measuring sensor and circuits.
Figure 2C:
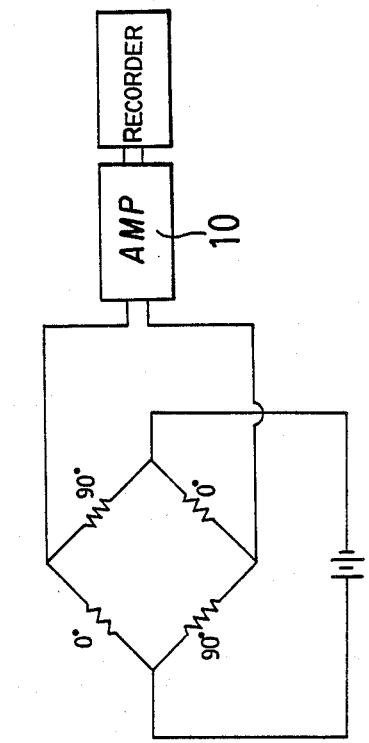
Figure 2B:
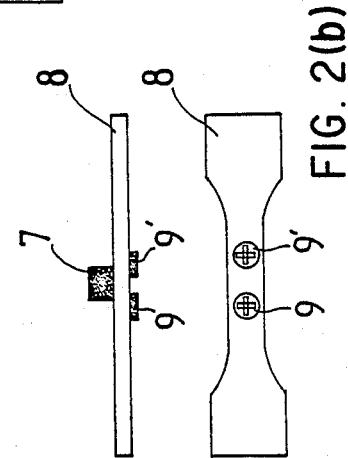

The configuration of the sensor is shown in FIG. 2 and the used materials and gauges are as follows.

Strain Gage: KFC-2-D16-11 (Kyowa Electronic Instrument Co., Ltd.)
Gauge Bond: M-Bond 61-Adhesive (Micro Measurement Group)
Sensor Plate: High Carbon Steel (FIG. 2($b$))
Sensor Case: Steel
Numeral 11 is a vacuum bag, 12 is an air breather, 13 is a metal plate, 14 is a base metal plate, 15 is a vacuum pump, 16 is a temperature sensor, and 17 is an autoclave.

Figure 3:
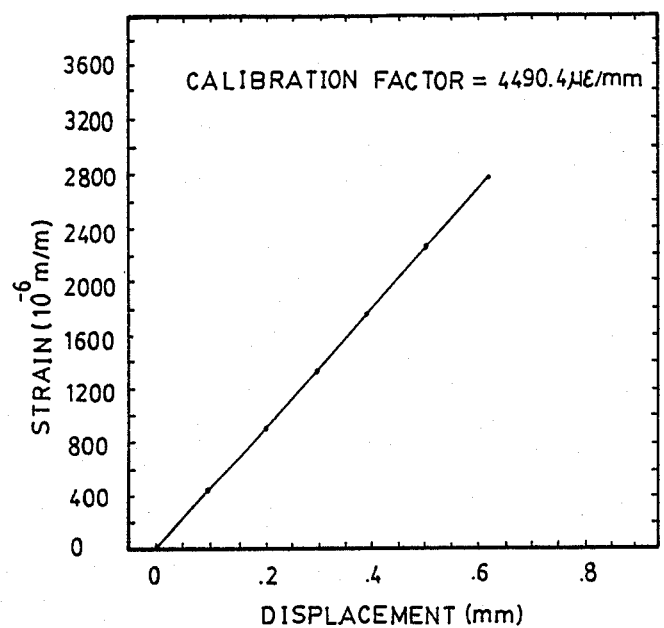
FIG. 3 shows a calibration curve for strain-displacement relationship of the sensor of FIG. 2.

The relationship between the displacement and signal of the sensor is determined using a calibrator for extensometers (Model 4MBR of Boeckler Instruments). The calibration factor is found to be 4490 $\mu$/mm and a linearity error is about 3.0% within the measuring range (FIG. 3). In order to increase the thermal stability of the sensor, a full bridge circuit is used and the distance between the gauges is made as narrow as possible.

Figure 4:
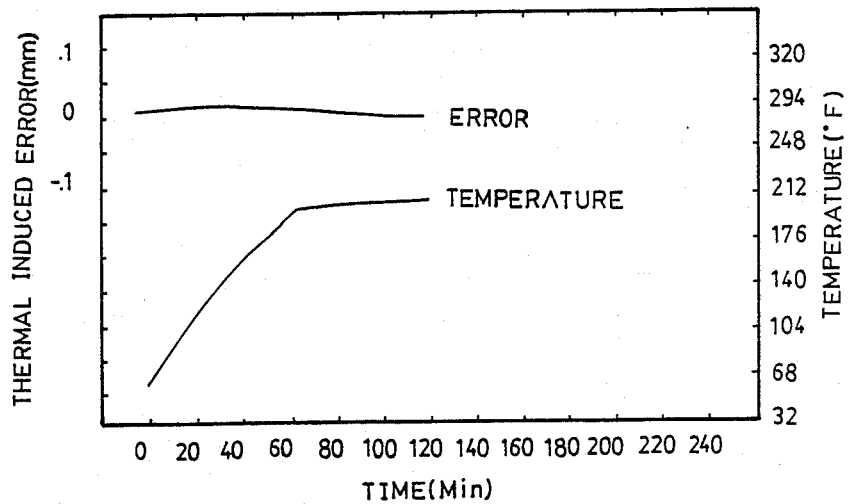
FIG. 4 shows the characteristics of temperature induced error of the sensor.

Temperature included error of the sensor is checked by varying the temperature from 20° C. to 150° C. The maximum induced error was within ±1% of the whole measuring range of 0.7 mm (FIG. 4).

The measuring system for compaction behavior of composite laminates during cure, using the thickness measuring sensor, has a good linearity and temperature induced error is negligible in the measuring range. It can continuously monitor the thickness change of the composite laminate during curing. The measuring system can be used to monitor the cure process economically and determine the optimal cure cycle. Furthermore, the compaction signal can be fed back to the autoclave control system to accomplish a better control of the autoclave cure process variables, temperature and pressure.

What I claim is that:

1. A measuring system for the continuous monitoring of compaction behavior of composite laminates during an autoclave curing process under controlled temperature and pressure, the measuring system comprising:
   a steel dam surrounding at least two composite laminates of the same dimensions, said steel dam having a bottom;
   a very weak spring supporting said steel dam at said bottom to prevent side resin flow in a plane of a prepreg ply;
   a perforated steel plate placed on a top of said at least two composite laminates;
   bleeders placed on top of said perforated steel plate;
   thickness measuring sensor means placed between said at least two composite laminates, for measuring the thickness thereof;
   a strain amplifier for amplifying a signal from said thickness measuring sensor; and
   a recorder for recording an amplified signal from said strain amplifier.

2. A measuring system according to claim 1 wherein said thickness measuring means is a strain gauge.

3. A measuring system according to claim 1 further comprising a displacement transform block located beneath said perforated steel plate and a three point bending bar located below said displacement transform block.

4. A measuring system according to claim 3 wherein said thickness measuring sensor means is attached to said three point bending bar, said thickness measuring sensor means measuring a deflection of said three point bending bar.

* * * * *